(12) United States Patent
Rezende et al.

(10) Patent No.: US 11,587,344 B2
(45) Date of Patent: Feb. 21, 2023

(54) SCENE UNDERSTANDING AND GENERATION USING NEURAL NETWORKS

(71) Applicant: DeepMind Technologies Limited, London (GB)

(72) Inventors: Danilo Jimenez Rezende, London (GB); Seyed Mohammadali Eslami, London (GB); Karol Gregor, London (GB); Frederic Olivier Besse, London (GB)

(73) Assignee: DeepMind Technologies Limited, London (GB)

( * ) Notice: Subject to any disclaimer, the term of this patent is extended or adjusted under 35 U.S.C. 154(b) by 462 days.

(21) Appl. No.: 16/403,278

(22) Filed: May 3, 2019

(65) Prior Publication Data

US 2019/0258907 A1 Aug. 22, 2019

Related U.S. Application Data

(63) Continuation of application No. PCT/IB2017/056903, filed on Nov. 4, 2017.

(Continued)

(51) Int. Cl.
G06V 30/262 (2022.01)
G06K 9/62 (2022.01)
(Continued)

(52) U.S. Cl.
CPC ......... *G06V 30/274* (2022.01); *G06K 9/6256* (2013.01); *G06N 3/0445* (2013.01);
(Continued)

(58) Field of Classification Search
CPC .. G06K 9/726; G06K 9/6256; G06K 9/00718; G06T 7/70; G06T 7/90;
(Continued)

(56) References Cited

U.S. PATENT DOCUMENTS

2008/0240616 A1* 10/2008 Haering ............... G06V 10/147
382/294
2009/0185745 A1* 7/2009 Momosaki .......... G06F 16/2474
382/190
(Continued)

FOREIGN PATENT DOCUMENTS

CN 105868829 8/2016
CN 106056213 10/2016
(Continued)

OTHER PUBLICATIONS

Bruna et al, "Super-Resolution with Deep Convolutional Sufficient Statistics," arXiv preprint arXiv: 1511.05666, 2015, 17 pages.
(Continued)

*Primary Examiner* — John W Lee
(74) *Attorney, Agent, or Firm* — Fish & Richardson P.C.

(57) ABSTRACT

Methods, systems, and apparatus, including computer programs encoded on a computer storage medium, for image rendering. In one aspect, a method comprises receiving a plurality of observations characterizing a particular scene, each observation comprising an image of the particular scene and data identifying a location of a camera that captured the image. In another aspect, the method comprises receiving a plurality of observations characterizing a particular video, each observation comprising a video frame from the particular video and data identifying a time stamp of the video frame in the particular video. In yet another aspect, the method comprises receiving a plurality of observations characterizing a particular image, each observation comprising a crop of the particular image and data characterizing the crop of the particular image. The method processes each of the plurality of observations using an observation neural network to determine a numeric representation as output.

21 Claims, 5 Drawing Sheets

Related U.S. Application Data

(60) Provisional application No. 62/540,817, filed on Aug. 3, 2017, provisional application No. 62/418,144, filed on Nov. 4, 2016.

(51) Int. Cl.

| | |
|---|---|
| *G06N 3/04* | (2006.01) |
| *G06N 3/08* | (2006.01) |
| *G06T 7/70* | (2017.01) |
| *G06T 7/90* | (2017.01) |
| *G06T 11/00* | (2006.01) |
| *G06V 20/00* | (2022.01) |
| *G06V 20/40* | (2022.01) |
| *G06V 10/82* | (2022.01) |
| *G06N 3/084* | (2023.01) |

(52) U.S. Cl.
CPC ........... *G06N 3/0454* (2013.01); *G06N 3/084* (2013.01); *G06T 7/70* (2017.01); *G06T 7/90* (2017.01); *G06T 11/00* (2013.01); *G06V 20/00* (2022.01); *G06V 20/41* (2022.01); *G06T 2207/10004* (2013.01); *G06T 2207/10016* (2013.01); *G06T 2207/20081* (2013.01); *G06T 2207/20084* (2013.01); *G06T 2207/20132* (2013.01); *G06T 2207/30244* (2013.01)

(58) Field of Classification Search
CPC ........... G06T 11/00; G06T 2207/20132; G06T 2207/30244; G06T 2207/20084; G06T 2207/20081; G06T 2207/10016; G06T 2207/10004
See application file for complete search history.

(56) References Cited

U.S. PATENT DOCUMENTS

| | | | |
|---|---|---|---|
| 2011/0181711 A1* | 7/2011 | Reid ...................... | G06T 19/003 348/121 |
| 2016/0125572 A1 | 5/2016 | Byungin et al. | |
| 2017/0185872 A1* | 6/2017 | Chakraborty .......... | G06V 20/52 |

FOREIGN PATENT DOCUMENTS

| | | |
|---|---|---|
| EP | 3229459 | 10/2017 |
| JP | 2016082350 | 5/2016 |
| JP | 2019523597 | 8/2019 |
| KR | 1020160087222 | 7/2016 |
| WO | WO 2016/088437 | 9/2017 |
| WO | WO 2018/015791 | 1/2018 |

OTHER PUBLICATIONS

Kingma et al, "Auto-Encoding Variational Bayes,"arXiv preprint arXiv: 1312.6114, 2013, 14 pages.
PCT International Preliminary Report on Patentability in International Appln. No. PCT/IB2017/056903, dated Feb. 18, 2019, 10 pages.
PCT International Search Report in International Appln. No. PCT/IB2017/056903, dated Feb. 23, 2018, 19 pages.
Rezende et al, "Unsupervised Learning of 3D Structure from Images," Advances in Neural Information Processing Systems, 2016, pp. 10 pages.
Rezende, et al, "One-Shot Generalization in Deep Generative Models," arXiv preprint arXiv: 1603.05106, 2016, 10 pages.
Agrawal et al, "Learning to see by moving," Proceedings of the IEEE International Conference on Computer Vision, 2015, pp. 37-45.
Doersch et al, "Unsupervised visual representation learning by context prediction," International Conference on Computer Vision, 2015, 9 pages.
Eslami & Williams, "A Generative Model for Parts-based Object Segmentation," Advances in Neural Information Processing Systems 25, 2014, 9 pages.
Eslami et al, "Attend, infer, repeat: Fast scene understanding with generative models," NIPS, 2016, 9 pages.
Gregor et al, "DRAW: A Recurrent Neural Network for Image Generation," International Conference on Machine Learning, 2015, 10 pages.
Gregor et al, "Towards conceptual compression," Advances in Neural Information Processing Systems, 2016, pp. 3549-3557.
Heess et al, "Weakly Supervised Learning of Foreground-Background Segmentation Using Masked RBMs," International Conference on Artificial Neural Networks, 2011, 8 pages.
Higgins et al, "Early visual concept learning with unsupervised deep learning," CoRR, 12 pages.
Hinton et al, "The "wake-sleep" algorithm for unsupervised neural networks," Science, 1995, 12 pages.
Hinton et al, "Transforming Auto-encoders," International Conference on Artificial Neural Networks, 2011, 8 pages.
Hinton, "Training Products of Experts by Minimizing Contrastive Divergence," Neural Computation, 2002, pp. 1771-1800.
Huang & Murphy, "Efficient inference in occlusion-aware generative models of images," CoRR, 2015, 10 pages.
Jampani et al, "The Informed Sampler: A Discriminative Approach to Bayesian Inference in Generative Computer Vision Models," Special Issue on Generative Models in Computer Vision and Medical Imaging, 2015, 20 pages.
Kalchbrenner et al, "Video pixel networks," arXiv preprint arXiv: 1610.00527, 2016, 16 pages.
Krizhevsky et al, "ImageNet Classification with Deep Convolutional Neural Networks," Advances in Neural Information Processing Systems 25, 2012, 9 pages.
Kulkarni et al, "Deep Convolutional Inverse Graphics Network," Advances in Neural Information Processing Systems 28, 2015, 9 pages.
Kulkarni et al, "Picture: A probabilistic programming language for scene perception," Computer Vision and Pattern Recognition, 2015, 10 pages.
Le Roux et al, "Learning a generative model of images by factoring appearance and shape," International Conference on Artificial Neural Networks, 2011, pp. 593-650.
Long et al, "Fully convolutional networks for semantic segmentation," 2015, 10 pages.
Loper & Black, "OpenDR: An Approximate Differentiable Renderer," European Conference on Computer Vision, 2014, pp. 154-169.
Mansinghka et al, "Approximate Bayesian Image Interpretation using Generative Probabilistic Graphics Programs," Advances in Neural Information Processing Systems 26, 2013, 9 pages.
Memisevic et al, "Learning to represent spatial transformations with factored higher-order boltzmann machines," Neural Computation, 2010, 15 pages.
Patraucean et al, "Spatio-temporal video autoencoder with differentiable memory," arXiv preprint arXiv:1511.06309, 13 pages.
Pero et al, "Bayesian geometric modeling of indoor scenes," Computer Vision and Pattern Recognition(CVPR), 2012, pp. 2719-2726.
Ren et al, "Faster R-CNN: Towards real-time object detection with region proposal networks," Advances in Neural Information Processing Systems 28, 2015, 9 pages.
Rezende et al, "Stochastic Backpropagation and Approximate Inference in Deep Generative Models," International Conference on Machine Learning, 2014, 14 pages.
Salakhutdinov & Hinton, "Deep Boltzmann Machines," International Conference on Artificial Intelligence and Statistics, 2009, 8 pages.
Srivastava et al, "Unsupervised learning of video representations using lstms," arXiv preprint arXiv: 1502.04681, 10 pages.
Tang et al, "Learning Generative Models With Visual Attention," Advances in Neural Information Processing Systems 27, 2014, 9 pages.
Tatarchenko et al, "Multi-view 3d models from single images with a convolutional network," European Conference on Computer Vision, 2016, 20 pages.

(56) References Cited

OTHER PUBLICATIONS

Tu et al, "Image parsing: Unifying segmentation, detection, and recognition," International Journal of computer vision, 2005, pp. 63(2):113-140.

Zhao & Zhu, "Image parsing with stochastic scene grammar," NIPS, 2011, pp. 73-81.

Zhou & Berg, "Learning temporal transformations from time-lapse videos," European Conference on Computer Vision, 2016, 16 pages.

Zhou et al, "Learning deep features for scene recognition using places database," Advances in Neural Information Processing Systems 27, 2014, 9 pages.

Zhu & Mumford, "A Stochastic Grammar of Images," Foundations and Trends in Computer Graphics and Vision, 2006, 62 pages.

KR Office Action in Korean Appln. No. 10-2019-7015932, dated Nov. 30, 2020, 11 pages (with English translation).

Vondrick et al., "Anticipating the future by watching unlabeled video," Proceedings of the IEEE Conference on Computer Vision and Pattern Recognition, 2016, pp. 98-106.

JP Office Action in Japanese Appln. No. 2019-523597, dated Mar. 15, 2021, 7 pages (with English translation).

KR Office Action in Korean Appln. No. 10-2019-7015932, dated Jun. 29, 2021, 11 pages (with English translation).

Radford et al., "Unsupervised representation learning with deep convolutional generative adversarial networks," 4th International Conference on Learning Representations, May 2016, 16 pages.

Choy et al., "3D-R2N2: A Unified Approach for Single and Multi-view 3D Object Reconstruction," Computer Vision—ECCV 2016 : 14th European Conference, 8:628-644.

Office Action in European Appln. 17808162.6, dated Aug. 25, 2021, 9 pages.

JP Office Action in Japanese Appln. No. 2019-523597, dated Aug. 11, 2020, 7 pages (with English translation).

Sohn et al., "Learning Structured Output Representation using Deep Conditional Generative Models," Advances in Neural Information Processing Systems 28 (NIPS 2015), 2015, 9 pages.

Office Action in Korean Appln. 10-2019-7015932, dated Oct. 28, 2021, 3 pages.

Office Action in Chinese Appln. 201780077072.8, dated Oct. 20, 2022, 16 pages (with English translation).

Office Action in Japanese in Appln. No. 2021-101631, dated Aug. 15, 2022, 8 pages (with English translation).

Office Action in Korean Appln. 10-2019-7037705, dated Aug. 28, 2022, 4 pages.

Office Action in Japanese Appln. No. 2021-101631, dated Dec. 19, 2022, 4 pages (with English translation).

\* cited by examiner

SCENE UNDERSTANDING AND GENERATION USING NEURAL NETWORKS

CROSS-REFERENCE TO RELATED APPLICATIONS

This application is a continuation application of, and claims priority to, PCT Patent Application No. PCT/IB2017/056903, filed on Nov. 4, 2017, which application claims the benefit under 35 U.S.C. § 119(e) of U.S. Patent Application No. 62/540,817, filed Aug. 3, 2017 and U.S. Patent Application No. 62/418,144, filed Nov. 4, 2016. The disclosure of each of the foregoing applications is incorporated herein by reference.

BACKGROUND

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a scene understanding system implemented as computer programs on one or more computers in one or more locations that generates a semantic representation of an environment. The system receives observations characterizing the environment, each observation including an image of the environment and corresponding viewpoint data. For example, the environment may be a scene e.g. a 3D room containing objects, the images may be images of the scene, and the viewpoint data may identify, for each image, the location of a camera that captured the image. The system generates a semantic representation of the environment, i.e. a description of the underlying contents of the environment that is abstracted away from the particular pixel values of the observation images, by processing the observations with an observation neural network. The system does not impose any explicit constraints or structure on the semantic representation, but the system is trained to generate semantic representations that are expressive enough to render new images of the environment from arbitrary viewpoint data.

According to a first aspect there is provided a scene understanding system that is configured for receiving a plurality of observations characterizing a particular scene, each observation comprising an image of the particular scene and data identifying a location of a camera that captured the image; processing each of the plurality of observations using an observation neural network, wherein the observation neural network is configured to, for each of the observations: process the observation to generate a lower-dimensional representation of the observation; determining a numeric representation of the particular scene by combining the lower-dimension representations of the observations; and providing the numeric representation of the particular scene for use in characterizing the contents of the particular scene.

Some advantages of this approach are described later. The representations produced by implementations of the method/system have many applications, for example as a general image analysis/prediction system or as the front end for a reinforcement learning system.

In some implementations, the numeric representation is a collection of numeric values that represents underlying contents of the particular scene.

In some implementations, the numeric representation is a semantic description of the particular scene, as previously described.

In some implementations, combining the lower-dimension representations of the observations comprises: summing the lower-dimension representations to generate the numeric representation.

In some implementations, the system is further configured for: receiving data identifying a new camera location; and processing the data identifying the new camera location and the numeric representation of the particular scene using a generator neural network to generate a new image of the particular scene taken from a camera at the new camera location. As used herein references to the location of a camera are to be interpreted as comprising position and/or viewing direction. Thus the new camera location may comprise one or both of a new camera position and a new camera viewing direction or optical axis direction. The generator neural network may, for example, determine a prior distribution over a set of latent variables for determining pixel values for the new image (or as described later, video frame, or crop). The latent variables may comprise variables inferred by the generator neural network and may be conditioned upon the data identifying the new camera location and the numeric representation of the particular scene.

Thus in some implementations, the generator neural network is configured to: at each of a plurality of time steps: sample one or more latent variables for the time step, and update a hidden state as of the time step by processing the hidden state, the sampled latent variables, the numeric representation, and the data identifying the new camera location using a deep convolutional neural network to generate an updated hidden state; and after a last time step in the plurality of time steps: generate the new image of the particular scene from the updated hidden state after the last time step.

In some implementations, generating the new image of the particular scene from the updated hidden state after the last time step comprises: generating pixel sufficient statistics from the updated hidden state after the last time step; and sampling pixel values such as color values of pixels in the new image using the pixel sufficient statistics. Example pixel sufficient statistics are described in more detail later.

In some implementations, generator neural network and the observation neural network have been trained jointly with a posterior neural network configured to, during the training, receive a plurality of training observations and a target observation and generate a posterior output that defines a distribution over the one or more latent variables. Use of a posterior model is optional. However where present gradients may be backpropagated into the posterior neural network as well as into the observation and generation neural networks so that it learns a posterior distribution over the latent variables. When used to infer a new image the posterior output can be used to generate pixel values, for example by sampling from the posterior distribution. Using a posterior neural network can assist in providing more accurate image reconstructions. Such a posterior model can be with the second and third aspects described below.

In some implementations, the observation neural network has been trained to generate numeric representations that, in combination with a particular camera location, can be used by a generator neural network to generate an accurate reconstruction of a particular image of the particular scene taken from the particular camera location.

According to a second aspect there is provided a scene understanding system that is configured for receiving a plurality of observations characterizing a particular video, each observation comprising a video frame from the particular video and data identifying a time stamp of the video frame in the particular video; processing each of the plurality of observations using an observation neural network, wherein the observation neural network is configured to, for each of the observations: process the observation to generate a lower-dimensional representation of the observation; determining a numeric representation of the particular video by combining the lower-dimension representations of the observations; and providing the numeric representation of the particular video for use in characterizing the contents of the particular video.

In some implementations, the numeric representation is a collection of numeric values that represents underlying contents of the particular video.

In some implementations, the numeric representation is a semantic description of the particular video.

In some implementations, combining the lower-dimension representations of the observations comprises: summing the lower-dimension representations to generate the numeric representation.

In some implementations, the system is further configured for receiving data identifying a new time stamp; and processing the data identifying the new time stamp and the numeric representation of the particular video using a generator neural network to generate a new video frame at the new time stamp in the particular video.

In some implementations, the generator neural network is configured to: at each of a plurality of time steps: sample one or more latent variables for the time step, and update a hidden state as of the time step by processing the hidden state, the sampled latent variables, the numeric representation, and the data identifying the new time stamp using a deep convolutional neural network to generate an updated hidden state; and after a last time step in the plurality of time steps: generate the new video frame from the updated hidden state after the last time step.

In some implementations, generating the new video frame comprises: generating pixel sufficient statistics from the updated hidden state after the last time step; and sampling pixel values such as color values of pixels in the new video frame using the pixel sufficient statistics.

In some implementations, the generator neural network and the observation neural network have been trained jointly with a posterior neural network configured to, during the training, receive a plurality of training observations and a target observation and generate a posterior output that defines a distribution over the one or more latent variables.

In some implementations, the observation neural network has been trained to generate numeric representations that, in combination with a particular time stamp, can be used by a generator neural network to generate an accurate reconstruction of a particular video frame from the particular video at the particular time stamp.

According to a third aspect there is provided a scene understanding system that is configured for receiving a plurality of observations characterizing a particular image, each observation comprising a crop of the particular image and data identifying a location and size of the crop in the particular image; processing each of the plurality of observations using an observation neural network, wherein the observation neural network is configured to, for each of the observations: process the observation to generate a lower-dimensional representation of the observation; determining a numeric representation of the particular image by combining the lower-dimension representations of the observations; and providing the numeric representation of the particular image for use in characterizing the contents of the particular image.

In some implementations, the numeric representation is a collection of numeric values that represents underlying contents of the particular image.

In some implementations, the numeric representation is a semantic description of the particular image.

In some implementations, combining the lower-dimension representations of the observations comprises: summing the lower-dimension representations to generate the numeric representation.

In some implementations, the system is further configured for receiving data identifying a new crop location and a new crop size; and processing the data identifying the new crop location and the new crop size and the numeric representation of the particular image using a generator neural network to generate a new crop of the particular image at the new crop location and having the new crop size.

In some implementations, the generator neural network is configured to: at each of a plurality of time steps: sample one or more latent variables for the time step, and update a hidden state as of the time step by processing the hidden state, the sampled latent variables, the numeric representation, and the data identifying the new crop location and the new crop size using a deep convolutional neural network to generate an updated hidden state; and after a last time step in the plurality of time steps: generate the new crop of the particular image from the updated hidden state after the last time step.

In some implementations, generating the new crop of the particular image from the updated hidden state after the last time step comprises: generating pixel sufficient statistics from the updated hidden state after the last time step; and sampling pixel values such as color values of pixels in the new crop using the pixel sufficient statistics.

In some implementations, the generator neural network and the observation neural network have been trained jointly with a posterior neural network configured to, during the training, receive a plurality of training observations and a target observation and generate a posterior output that defines a distribution over the one or more latent variables.

In some implementations, the observation neural network has been trained to generate numeric representations that, in combination with a particular crop location and a particular crop size, can be used by a generator neural network to generate an accurate reconstruction of a particular crop of the particular image at the particular crop location and having the particular crop size.

The first, second and third aspects described above, and their respective further features may be combined. Thus, for example, a new video frame may be generated with a different camera location and/or at a new time and/or with a new crop.

The above aspects can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

Particular embodiments of the subject matter described in this specification can be implemented so as to realize one or more of the following advantages.

Particular embodiments of the subject matter described in this specification can be implemented so as to realize one or more of the following advantages. A scene understanding system as described in this specification generates semantic descriptions of scenes based on unlabeled training data, whereas conventional methods for scene understanding such as scene classification or semantic segmentation require labelled training data. Therefore the system as described in this specification requires less time and fewer computational resources to pre-process the training data, e.g. by labeling, than some conventional systems. Moreover, since unlabeled training data is more readily available than labeled training data, the system as described in this specification can be trained on a larger collection of training data than some conventional systems that require labelled training data, and thereby the system as described in this specification can produce semantic representations superior to those produced by some conventional systems.

The scene understanding system described in this specification includes an explicit mechanism to encourage the system to learn how different views of an environment relate to one another, thereby causing the system to produce superior semantic representations than conventional systems, such as unconditional density models.

The scene understanding system as described in this specification can be included as a module in other systems which process observations of an environment. The robustness and efficiency of such systems may be improved by processing the lower-dimensional numeric representations of observations generated by the scene understanding system instead of directly processing the observations themselves. In particular, fewer computational resources may be required to process the lower-dimensional numeric representations generated by the scene understanding system. For example, the scene understanding system could be included in a reinforcement learning system to generate lower-dimensional representations of observations of the environment for processing by the reinforcement learning system, instead of the reinforcement learning system directly processing raw observations of the environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
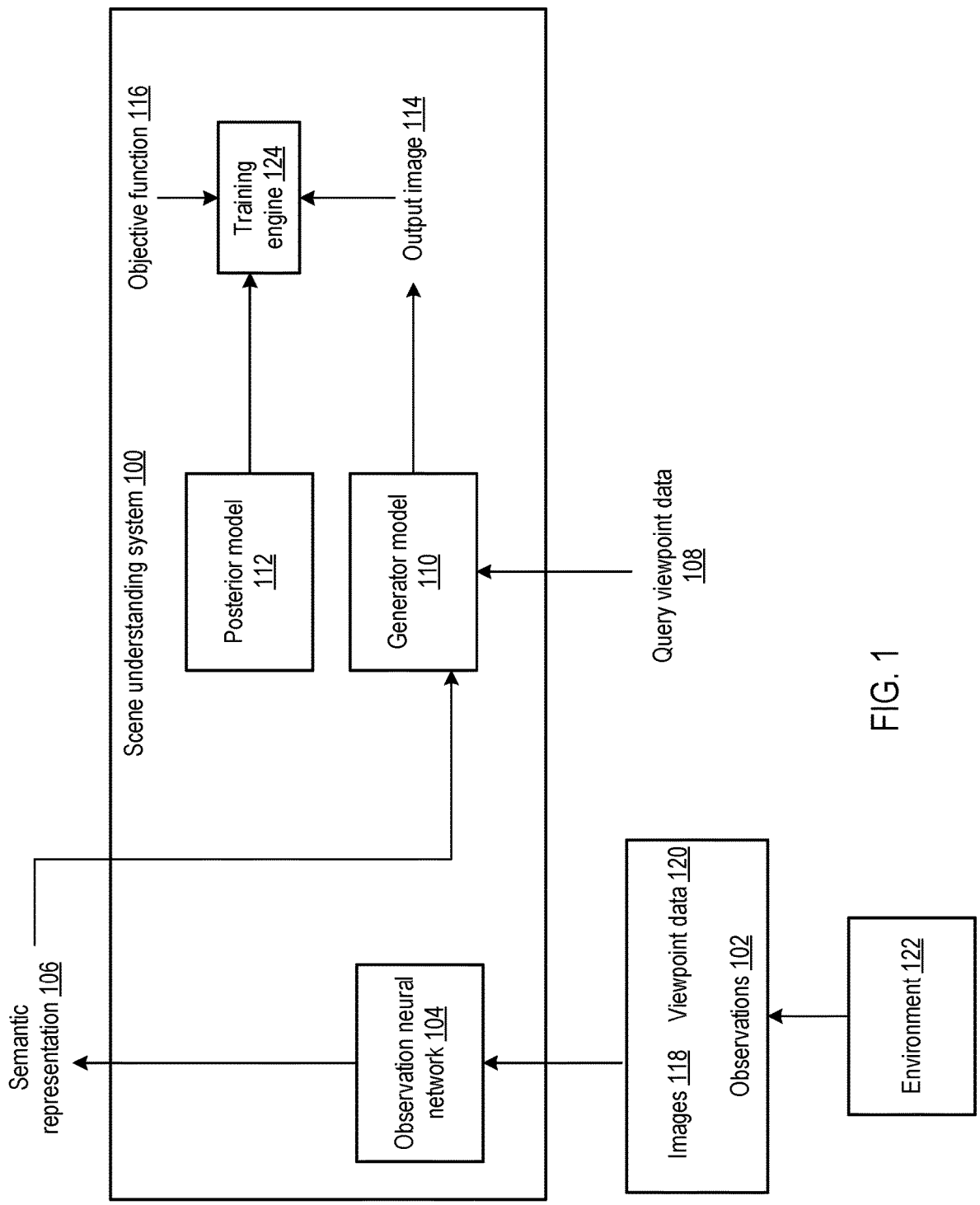
FIG. 1 shows an example scene understanding system.

FIG. 1 shows an example scene understanding system 100. The scene understanding system 100 is an example of a system implemented as computer programs on one or more computers in one or more locations in which the systems, components, and techniques described below are implemented.

The system 100 receives observations 102 characterizing an environment 122, where the observations include images 118 and corresponding viewpoint data 120.

In some implementations, the environment 122 is a scene, e.g. a scene in the natural world or a computer-generated scene, the images 118 are images of the scene, e.g. RGB images, and the viewpoint data 120 identifies respective locations of a camera that captured each image 118, e.g. the 3D position, yaw, and pitch of the camera relative to some fixed coordinate system.

In some other implementations, the environment 122 is a video, e.g. a video depicting the natural world or a computer-generated world, the images 118 are video frames from the video, and the viewpoint data 120 identifies respective time stamps of each video frame.

In yet other implementations, the environment 122 is a particular image, e.g. an image of the natural world captured by a camera or a computer-generated image, the images 118 are crops of the particular image, i.e. sub-images of the particular image, and the viewpoint data 120 identifies parameters of the crops of the particular image that define the images 118, e.g. the coordinates of the vertices of a bounding box that defines the crop of the particular image.

The observation neural network 104 is a convolutional neural network configured to receive each of the observations 102 characterizing the environment 122 as input and process each of the observations 102 in accordance with the values of a set of parameters, referred to in this specification as observation neural network parameters, to generate a lower-dimensional numerical representation of each observation 102. The system 100 combines the lower-dimensional numerical representations of each observation 102 to generate as output a numerical semantic representation 106 of the environment 122, i.e. a description of the underlying contents of the environment 122 that is abstracted away from the particular pixel values of the observation images 118.

The system 100 combines the lower-dimensional representations of each observation to generate the semantic representation 106. In some cases, the system 100 combines the lower-dimensional representations of each observation in accordance with a permutation invariant transformation, i.e. a transformation that is invariant to the order in which the lower-dimensional representations are combined. For example, the system 100 may combine the lower-dimensional representations of each observation 102 to generate the semantic representation 106 by element-wise summing them. In some cases, the system 100 combines the lower-dimensional representations of each observation by sequentially providing them as input to a recurrent neural network (RNN) and determining the final state of the recurrent neural network to be the semantic representation 106.

The system 100 does not impose any explicit constraints or structure on the semantic representation 106, beyond a training engine 124 training the system 100 by optimizing a training objective function 116. The semantic representation 106 should be expressive enough that a generator model 110 can render a new image of the environment 122, i.e. the output image 114, from arbitrary new viewpoint data, i.e. the query viewpoint data 108, given the semantic representation 106 of the environment 122.

For example, if the environment 122 is a scene and the query viewpoint data 108 identifies a new location of a camera in the scene, the output image 114 may be a predicted new image of the scene taken from a camera at the new camera location.

As another example, if the environment 122 is a video and the query viewpoint data 108 identifies a new time stamp of the video, the output image 114 may be a predicted new video frame at the new time stamp in the video.

As yet another example, if the environment 122 is a particular image and the query viewpoint data 108 identifies new parameters of a crop of the particular image, the output image 114 may be a predicted new crop of the particular image corresponding to the new parameters.

The generator model 110 is configured to receive the semantic representation 106 and query viewpoint data 108 as input, to process the inputs in accordance with a set of parameters which in this specification will be referred to as generator model parameters, and to generate as output pixel sufficient statistics for the output image 114 and a probability distribution, referred to in this specification as a prior distribution, over a set of one or more latent variables, i.e. variables whose values are inferred by the generator model 110 conditional on the input to the generator model 110 rather than received as an input. Pixel sufficient statistics for the output image/video frame/crop refers to data identifying the parameters of a probability distribution, e.g. the mean and standard deviation of a Normal distribution, that represent the predicted distribution of intensities for each pixel in the output image 114 (or video frame or crop), i.e., from which the intensity for each pixel can be sampled. In some implementations, the intensities for each pixel may be RGB intensities, and the probability distributions may be three-dimensional, e.g. three-dimensional Normal distributions. The system determines the output image 114 by sampling the intensity of each pixel of the output image 114 according to the pixel sufficient statistics for the output image 114. An example process for rendering an output image 114 and generating a prior distribution using the generator model 110 is described with reference to FIG. 4.

In some implementations, the system 100 includes a posterior model 112 to facilitate training the system 100 by the training engine 124. The posterior model 112 is configured to receive the semantic representation 106 of the environment, the query viewpoint data 108, and the image of the environment corresponding to the query viewpoint data 108, to process the inputs in accordance with a set of parameters which in this specification will be referred to as posterior model parameters, and to generate as output a probability distribution, referred to in this specification as a posterior distribution, over the latent variables. The posterior model parameters may comprise weights of a neural network. An example process for generating a posterior distribution using the posterior model 112 is described with reference to FIG. 5.

The training engine 124 jointly trains the observation neural network 104 and the generator model 110 by adjusting the values of the observation neural network parameters and the generator model parameters to increase the probability of generating an accurate output image 114 corresponding to query viewpoint data 108. Specifically, the training engine 124 adjusts the values of the observation neural network parameters and the generator model parameters by backpropagating gradients determined based on the objective function 116. For implementations where the objective function depends on the posterior distribution generated by the posterior model 112, backpropagating gradients involves adjusting the values of the posterior model parameters in addition to the generator model parameters and the observation neural network parameters. An example process for training the system 100 is described with reference to FIG. 3.

Once trained, the observation neural network 104 can be included as a module in other systems which process observations of an environment. The robustness and efficiency of such systems may be improved by processing the lower-dimensional numeric representations of observations generated by the observation neural network 104 instead of directly processing the observations themselves. For example, an agent interacting with an environment may be trained by a reinforcement learning system which processes observations of the environment to determine actions which would maximize a cumulative reward received by the agent. The observation neural network could be included in a reinforcement learning system to generate lower-dimensional representations of observations of the environment for processing by the reinforcement learning system to determine actions to be performed by the agent, instead of the reinforcement learning system directly processing the observations to determine actions to be performed by the agent. In some cases, the environment may be a simulated environment and the agent may be implemented as one or more computer programs interacting with the simulated environment by navigating through the simulated environment. In some other cases, the environment may be a real-world environment and the agent may be a mechanical agent interacting with the real-world environment. For example, the agent may be a robot performing a task or an autonomous or semi-autonomous vehicle navigating through the environment.

Figure 2:
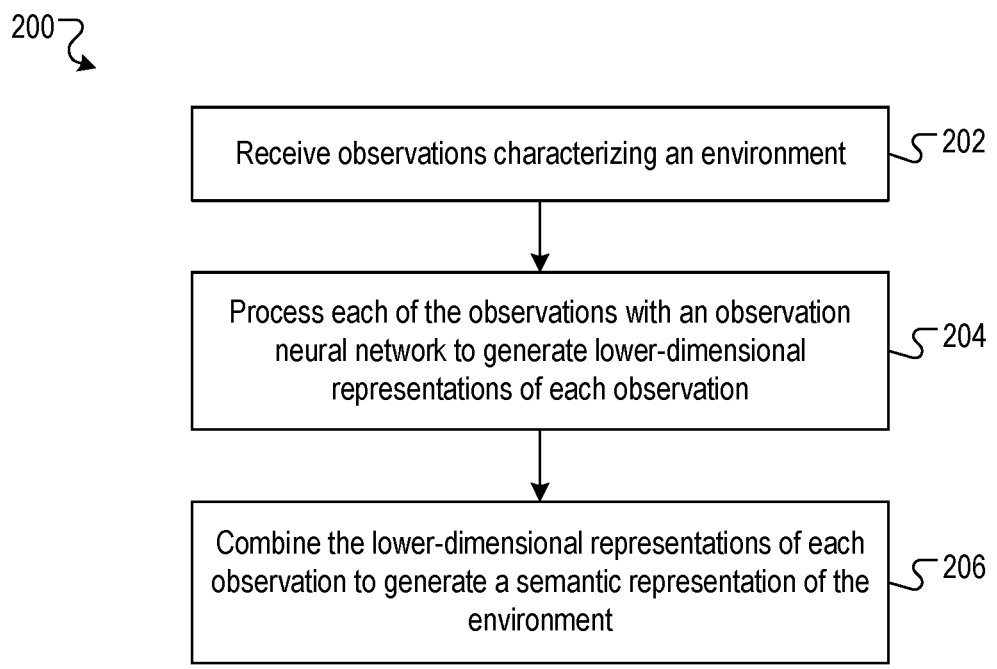
FIG. 2 is a flow diagram of an example process for generating a semantic representation of an environment using the scene understanding system.

FIG. 2 is a flow diagram of an example process 200 for generating a semantic representation of an environment using the scene understanding system. For convenience, the process 200 will be described as being performed by a system of one or more computers located in one or more locations. For example, a scene understanding system, e.g., the scene understanding system 100 of FIG. 1, appropriately programmed in accordance with this specification, can perform the process 200.

The system receives observations characterizing an environment, where the observations include paired image and viewpoint data (step 202). In some implementations, the environment is a scene, e.g. a scene in the natural world or a computer-generated scene, the images are images of the scene, e.g. RGB images, and the viewpoint data identifies respective locations of a camera that captured each image, e.g. the 3D position, yaw, and pitch of the camera. In some other implementations, the environment is a video, e.g. a video depicting the natural world or a computer-generated world, the images are video frames from the video, and the viewpoint data identifies respective time stamps of each video frame. In yet other implementations, the environment is a particular image, e.g. an image of the natural world captured by a camera or a computer-generated image, the images are crops of the particular image, i.e. sub-images of the particular image, and the viewpoint data identifies parameters of the crops of the particular image that define the images, e.g. the coordinates of the vertices of a bounding box that defines the crop of the particular image.

The observation neural network processes each of the observations in accordance with the values of the observation neural network parameters to generate as output lower-dimensional representations of each observation (step 204).

In some implementations, the observation neural network is configured to receive the concatenation of the viewpoint data and the corresponding image as input. In this specification, concatenating viewpoint data and a corresponding image or feature map refers to 'broadcasting' the values of the viewpoint data in the spatial dimensions of the corresponding image or feature map to obtain the correct size, i.e. repeating and appending the values of the viewpoint data along each spatial dimension of the corresponding image or feature map. A feature map refers to an array of activations generated at a hidden layer of a neural network in response to processing a network input.

In some other implementations, the observation neural network is configured to receive the image as input to a first layer of the observation neural network, and the system provides the viewpoint data to the observation neural network by concatenating the viewpoint data with feature maps of one or more intermediate layers of the observation neural network, i.e. one or more layers after the first layer, and provides the concatenated feature map and viewpoint data as input to the next layer of the observation neural network, i.e. the layer after the intermediate layer.

The system combines the lower-dimensional representations of each observation to generate a semantic representation of the environment (step 206). In some implementations, the system combines the lower-dimensional representations of each observation to generate the semantic representation in accordance with a permutation invariant transformation, i.e. a transformation that is invariant to the order in which the lower-dimensional representations are combined, for example by element-wise summing them. In some other implementations, the system combines the lower-dimensional representations of each observation by sequentially providing them as input to a RNN and determining the final state of the recurrent neural network to be the semantic representation.

Figure 3:
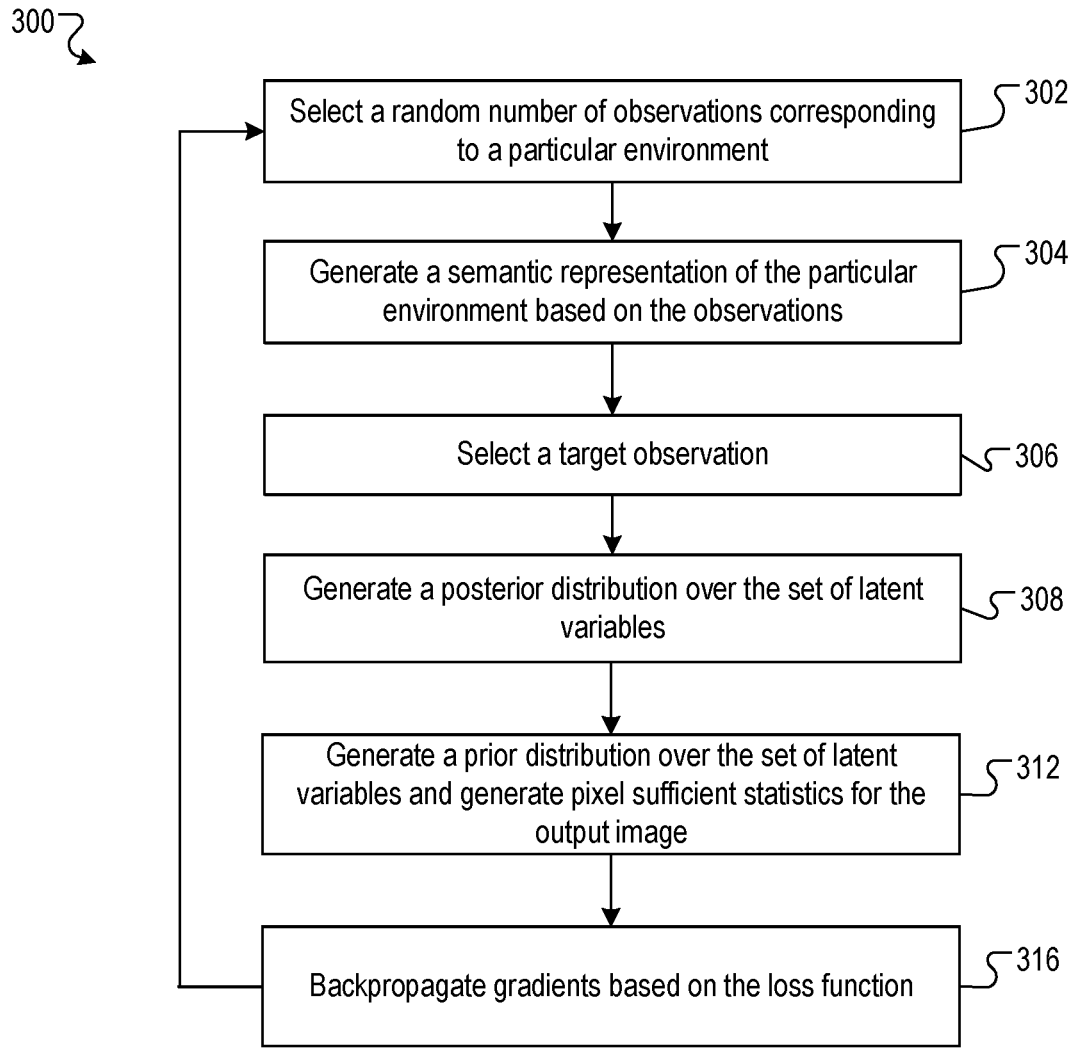
FIG. 3 is a flow diagram of an example process for training the scene understanding system.

FIG. 3 is a flow diagram of an example process 300 for training the scene understanding system. For convenience, the process 300 will be described as being performed by an engine including one or more computers located in one or more locations. For example, a training engine, e.g., the training engine 124 of FIG. 1, appropriately programmed in accordance with this specification, can perform the process 300.

The engine selects a random number of observations corresponding to a particular environment in a set of training data (step 302). The training data includes sets of observations corresponding to multiple environments of the same type, e.g. multiple scene environments or multiple video environments. In general, different environments may have different numbers of corresponding observations.

The engine provides the selected observations as input to the observation neural network which processes the selected observations according to the values of the observation neural network parameters to generate a semantic representation of the environment (step 304). The process of generating a sematic representation of an environment is described with reference to FIG. 2.

The engine selects an additional observation corresponding to the particular environment from the set of training data, referred to in this specification as the target observation (step 306). For example, the engine may randomly sample an observation corresponding to the particular environment from amongst those observations that were not selected in step 302.

The system provides the target observation, i.e. the target image and the target viewpoint data, and the semantic representation of the environment as input to the posterior model, which processes the inputs in accordance with the values of the set of posterior model parameters, to generate as output a posterior distribution over the set of latent variables (step 308). The process of generating a posterior distribution is described with reference to FIG. 5.

The system provides the semantic representation of the environment and the target viewpoint data of the target observation to the generator model, which processes the semantic representation and the target viewpoint data in accordance with the values of the set of generator model parameters and the posterior distribution generated by the posterior model, to generate as output pixel sufficient statistics for the output image and a prior distribution over the set of latent variables (step 312). An example process for generating a prior distribution and pixel sufficient statistics for the output image using the generator model and the posterior distribution generated by the posterior model is described with reference to FIG. 4. Specifically, in step 408 of FIG. 4, the system determines values of the latent variables corresponding to each time step by sampling from the posterior distribution for the time step generated by the posterior model.

The engine determines gradients of a loss function and backpropagates the gradients to adjust the parameters of the system (step 316). In some implementations, the loss function is given by (or includes):

$$\log p_\theta(x|z,y) - \text{KL}[q(z|x,y) \| p_\psi(z|y)]$$

where y is target viewpoint data, x is the target image, $p_\theta(x|z, y)$ is the probability of the target image x according to the pixel sufficient statistics for the output image generated by the generator model in accordance with the posterior distribution generated by the posterior model, $p_\psi(z|y)$ is the prior distribution over the latent variables determined by the generator model, $q(z|x, y)$ is the posterior distribution over the latent variables generated by the posterior model, KL refers to the Kullback-Leibler divergence measure, i.e. a measure of how different one probability distribution is from another. In these implementations, backpropagating gradients involves adjusting the parameters of the generator model, the posterior model, and the observation neural network, to minimize the loss function.

Figure 4:
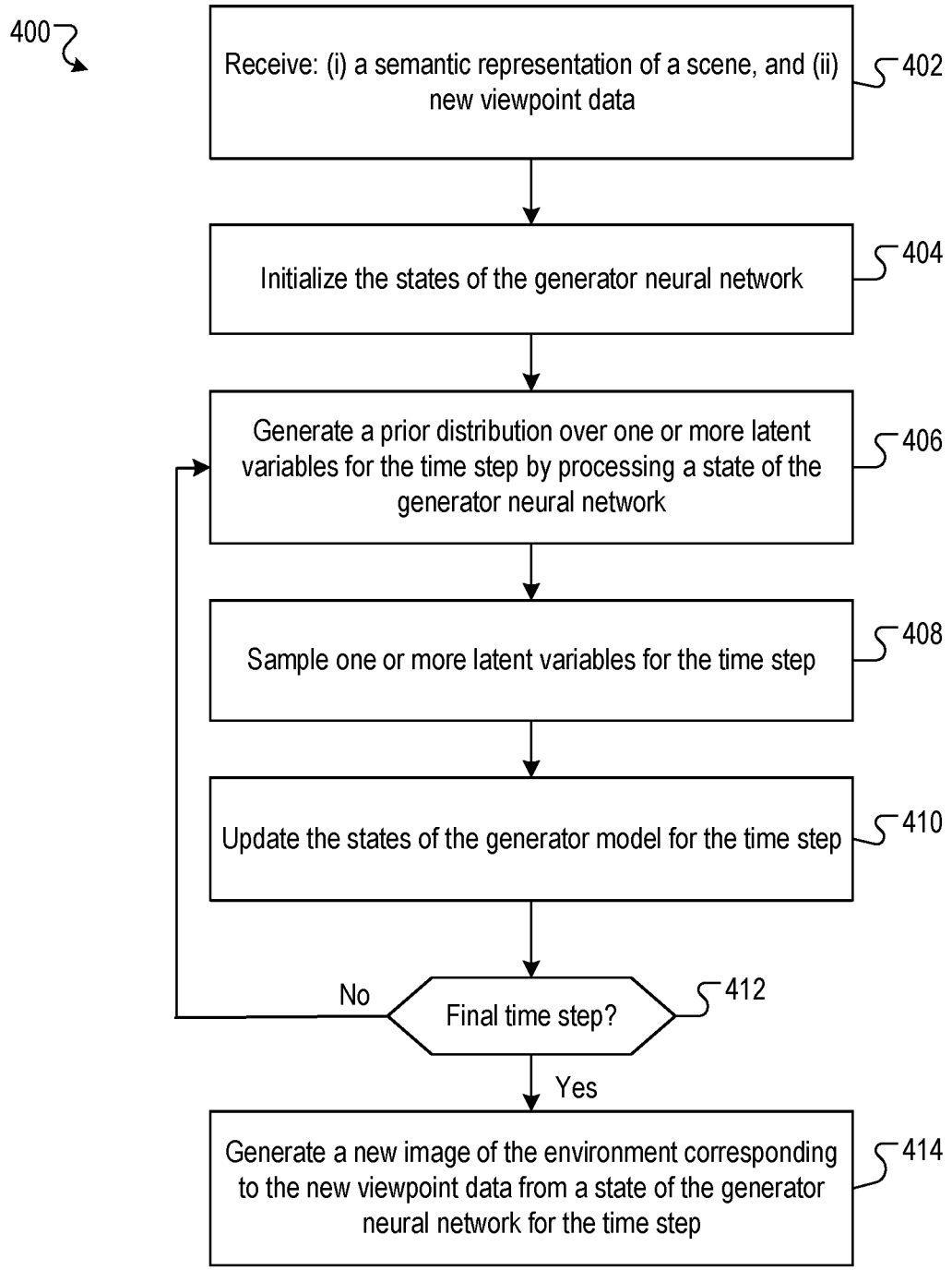
FIG. 4 is a flow diagram of an example process for rendering an image and generating a prior distribution using a generator model.

FIG. 4 is a flow diagram of an example process 400 for rendering an image and generating a prior distribution using a generator neural network. For convenience, the process 400 will be described as being performed by a system of one or more computers located in one or more locations. For example, a scene understanding system, e.g., the scene understanding system 100 of FIG. 1, appropriately programmed in accordance with this specification, can perform the process 400.

The generator model receives a semantic representation of the environment and viewpoint data (step 402). For example, if the environment is a scene then the viewpoint data may identify a location of a camera in the scene. As another example, if the environment is a video then the viewpoint data may identify a time stamp of the video. As yet another example, if the environment is a particular image then the viewpoint data may identify parameters of a crop of the particular image.

The system initializes the states of, for example, a recurrent neural network of the generator model (step 404). In some implementations, the recurrent neural network is a convolutional skip-connection long short-term memory (LSTM) network, and the system initializes the states of the recurrent neural network of the generator model by setting them to zero, i.e.:

$$(c_0^g, h_0^g, u_0^g) = (0, 0, 0),$$

where $c_0^g$ denotes the cell state at time step zero, $u_0^g$ denotes the skip connection state at time step zero, and $h_0^g$ denotes the output state at time step zero.

At each of a pre-determined number of time steps, a latent variable neural network of the generator model processes a state of the recurrent neural network for the time step in accordance with a set of latent variable neural network parameters to generate as output a set of sufficient statistics of the prior distribution for a subset of the latent variables corresponding to the time step (step 406). In some implementations, the latent variable neural network processes the output state of the recurrent neural network for the time step to generate as output the set of sufficient statistics of the prior distribution. In some implementations, the latent variable neural network is a convolutional neural network.

At each time step, the generator model determines values of the latent variables corresponding to the time step (step 408). During training of the system, described with reference to process 300 of FIG. 3, the generator model determines values of the latent variables corresponding to the time step by sampling from the posterior distribution generated by the posterior model. To generate a new image of the environment corresponding to a previously unseen viewpoint, the generator model determines values of the latent variables corresponding to the time step by sampling from the prior distribution generated by the generator model, or in some cases, from a standard Normal distribution (i.e. a Normal distribution with mean 0 and variance 1).

The generator model updates the states of the generator model for the time step by processing the semantic representation, the viewpoint data, one or more current states of the recurrent neural network, and the values of the one or more latent variables for the time step, in accordance with the set of recurrent neural network parameters (step 410). For example, the generator model may update the states of the generator model according to the following relationships:

$$(c_{l+1}^g, h_{l+1}^g) = C_\theta^g(v^q, r, c_l^g, h_l^g, z_l),$$

$$u_{l+1}^g = u_l^g + \Delta(h_{l+1}^g),$$

where $C_\theta^g$ represents the state update of a convolutional LSTM network, $\Delta$ is a transposed convolutional layer, $v^q$ is the viewpoint data, r is the semantic representation of the environment, $c_{l+1}^g$ is the cell state of the recurrent neural network at time (l+1), $h_{l+1}^g$ is the output state of the recurrent neural network at time (l+1), and $z_l$ is the latent variable for the time step.

The system determines whether the current time step is the final time step of the pre-determined number of time steps (step 412).

In response to determining that the current time step is not the final time step of the pre-determined number of time steps, the system returns to step 406 and repeats the preceding steps.

In response to determining that the current time step is the final time step of the pre-determined number of time steps, the system generates a new image of the environment corresponding to the new viewpoint data by providing a current state of the recurrent neural network as input to a decoder neural network and processing the state in accordance with a set of decoder neural network parameters (step 414). In some implementations, the system provides the skip-connection state of the recurrent neural network as input to the decoder neural network. The decoder neural network generates as output pixel sufficient statistics for the intensities of the pixels of the output image, and the system samples an output image in accordance with the pixel sufficient statistics. For example, if the environment is a scene and the viewpoint data identifies a new location of a camera in the scene, the output image may be a predicted new image of the scene taken from a camera at the new camera location. As another example, if the environment is a video and the viewpoint data identifies a new time stamp of the video, the output image may be a predicted new video frame at the new time stamp in the video. As yet another example, if the environment is a particular image and the viewpoint data identifies new parameters of a crop of the particular image, the output image may be a predicted new crop of the particular image corresponding to the new parameters.

Figure 5:
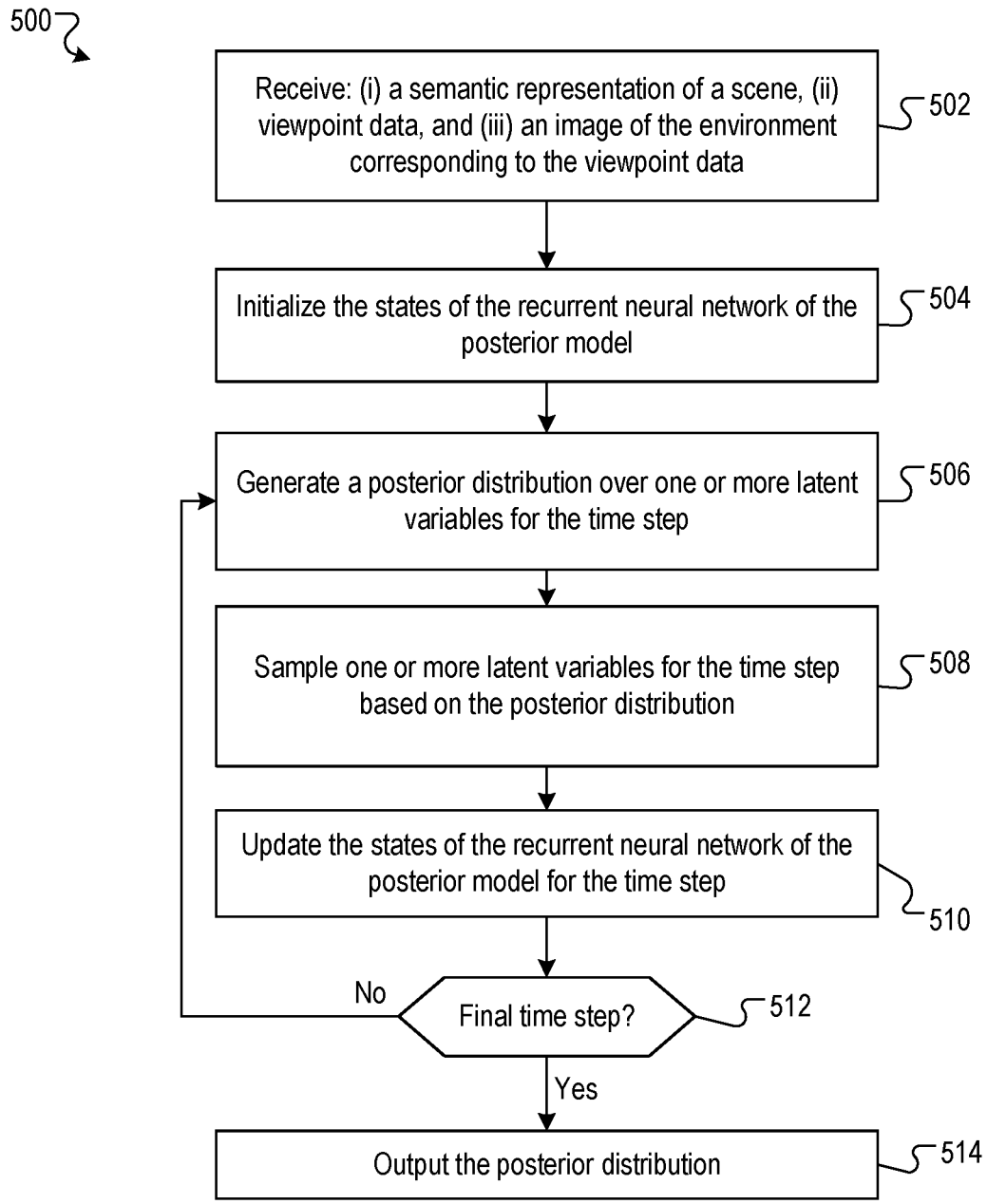
FIG. 5 is a flow diagram of an example process for generating a posterior distribution using a posterior model.

FIG. 5 is a flow diagram of an example process 500 for generating a posterior distribution over the latent variables using a posterior model. For convenience, the process 500 will be described as being performed by a system of one or more computers located in one or more locations. For example, a scene understanding system, e.g., the scene understanding system 100 of FIG. 1, appropriately programmed in accordance with this specification, can perform the process 500.

The posterior model receives a semantic representation of the environment, viewpoint data, and an image of the environment corresponding to the viewpoint data (step 502). For example, if the environment is a scene and the viewpoint data identifies a location of a camera in the scene, the image may be an image of the scene taken from a camera at the camera location. As another example, if the environment is a video and the viewpoint data identifies a time stamp of the video, the image may be a new video frame at the time stamp in the video. As yet another example, if the environment is a particular image and the viewpoint data identifies parameters of a crop of the particular image, the image may be a crop of the particular image corresponding to the parameters.

The system initializes the states of a recurrent neural network of the posterior model (step 504). In some implementations, the recurrent neural network is a convolutional LSTM network, and the system initializes the states of the recurrent neural network of the posterior model by setting them to zero, i.e.:

$$(c_0^e, h_0^e) = (0, 0),$$

where $c_0^e$ denotes the cell state and $h_0^e$ denotes the output state at time step zero.

At each of a pre-determined number of time steps, a latent variable neural network of the posterior model processes a current state of the recurrent neural network for the time step in accordance with a set of latent variable neural network parameters to generate as output a set of sufficient statistics of the posterior distribution for a subset of the latent variables corresponding to the time step (step 506). In some implementations, the current state processed by the posterior model is the output state of the recurrent neural network of the posterior model. In some implementations, the latent variable neural network of the posterior model is a convolutional neural network.

At each time step, the posterior model samples from the posterior distribution for the time step to determine values for the subset of latent variables corresponding to the time step (step 508).

The posterior model updates the states of the posterior model for the time step by processing the semantic representation, the viewpoint data, one or more current states of the recurrent neural network of the posterior model, one or more latent variables for the time step sampled from the posterior distribution for the time step, and in some implementations, one or more current states of the recurrent neural network of the generator model, in accordance with the set of parameters of the recurrent neural network of the posterior model (step 510). For example, the posterior model may update the states of the posterior model according to the following relationships:

$$(c_{l+1}^e, h_{l+1}^e) = C_\phi^e(x^q, v^q, r, c_l^e, h_l^e, h_l^g, u_l^g, z_l),$$

where $C_\phi^e$ represents the state update of the convolutional LSTM network of the posterior model, $x^q$ is the image of the environment, $v^q$ is the viewpoint data, r is the semantic representation of the environment, $c_{l+1}^e$ is the cell state of the recurrent neural network of the posterior model at time (l+1), $h_{l+1}^e$ is the output state of the recurrent neural network of the posterior model at time (l+1), $h_l^g$ is the output state of the recurrent neural network of the generator model at time l, $u_l^g$ is denotes the skip connection state of the recurrent neural network of the generator model at time step l, and $z_l$ is the latent variable for the time step sampled from the posterior distribution.

The system determines whether the current time step is the final time step of the pre-determined number of time steps (step 512).

In response to determining that the current time step is the final time step of the pre-determined number of time steps, the posterior model outputs the posterior distributions over the one or more latent variables for each of the time steps (step 514).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and computer-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer implemented method comprising:
   receiving a plurality of observations characterizing a particular scene, each observation comprising: (i) an image of the particular scene, and (ii) data identifying a location of a camera that captured the image;
   processing each of the plurality of observations using an observation neural network, wherein the observation neural network is configured to, for each of the observations:
   process the observation to generate as output a lower-dimensional representation of the observation;
   determining a numeric representation of the particular scene by combining the lower-dimension representations of the observations;
   providing the numeric representation of the particular scene for use in characterizing contents of the particular scene;
   receiving data identifying a new camera location; and
   processing: (i) the data identifying the new camera location, and (ii) the numeric representation of the particular scene, using a generator neural network to generate a new image of the particular scene taken from a camera at the new camera location.

2. The method of claim 1, wherein the numeric representation is a collection of numeric values that represents underlying contents of the particular scene.

3. The method of claim 1, wherein the numeric representation is a semantic description of the particular scene.

4. The method of claim 1, wherein combining the lower-dimension representations of the observations comprises:
summing the lower-dimension representations to generate the numeric representation.

5. The method of claim 1, wherein the generator neural network is configured to:
at each of a plurality of time steps:
sample one or more latent variables for the time step, and
update a hidden state as of the time step by processing the hidden state, the sampled latent variables, the numeric representation, and the data identifying the new camera location using a deep convolutional neural network to generate an updated hidden state; and
after a last time step in the plurality of time steps:
generate the new image of the particular scene from the updated hidden state after the last time step.

6. The method of claim 5, wherein generating the new image of the particular scene from the updated hidden state after the last time step comprises:
generating pixel sufficient statistics from the updated hidden state after the last time step; and
sampling color values of pixels in the new image using the pixel sufficient statistics.

7. The method of claim 1, wherein the observation neural network has been trained to generate numeric representations that, in combination with a particular camera location, is usable by a generator neural network to generate a reconstruction of a particular image of the particular scene taken from the particular camera location.

8. A computer implemented method comprising:
receiving a plurality of observations characterizing a particular video, each observation comprising: (i) a video frame from the particular video and, (ii) data identifying a time stamp of the video frame in the particular video;
processing each of the plurality of observations using an observation neural network, wherein the observation neural network is configured to, for each of the observations:
process the observation to generate as output a lower-dimensional representation of the observation;
determining a numeric representation of the particular video by combining the lower-dimension representations of the observations;
providing the numeric representation of the particular video for use in characterizing contents of the particular video;
receiving data identifying a new time stamp; and
processing: (i) the data identifying the new time stamp, and (ii) the numeric representation of the particular video, using a generator neural network to generate a new video frame at the new time stamp in the particular video.

9. The method of claim 8, wherein the numeric representation is a collection of numeric values that represents underlying contents of the particular video.

10. The method of claim 8, wherein the numeric representation is a semantic description of the particular video.

11. The method of claim 8, wherein combining the lower-dimension representations of the observations comprises:
summing the lower-dimension representations to generate the numeric representation.

12. The method claim 8, wherein the generator neural network is configured to:
at each of a plurality of time steps:
sample one or more latent variables for the time step, and
update a hidden state as of the time step by processing the hidden state, the sampled latent variables, the numeric representation, and the data identifying the new time stamp using a deep convolutional neural network to generate an updated hidden state; and
after a last time step in the plurality of time steps:
generate the new video frame from the updated hidden state after the last time step.

13. The method of claim 12, wherein generating the new video frame comprises:
generating pixel sufficient statistics from the updated hidden state after the last time step; and
sampling color values of pixels in the new video frame using the pixel sufficient statistics.

14. The method claim 8, wherein the observation neural network has been trained to generate numeric representations that, in combination with a particular time stamp, is usable by a generator neural network to generate a reconstruction of a particular video frame from the particular video at the particular time stamp.

15. A computer implemented method comprising:
receiving a plurality of observations characterizing a particular image, each observation comprising: (i) a crop of the particular image, and (ii) data identifying a location and size of the crop in the particular image;
processing each of the plurality of observations using an observation neural network, wherein the observation neural network is configured to, for each of the observations:
process the observation to generate as output a lower-dimensional representation of the observation;
determining a numeric representation of the particular image by combining the lower-dimension representations of the observations;
providing the numeric representation of the particular image for use in characterizing contents of the particular image;
receiving data identifying a new crop location and a new crop size; and
processing: (i) the data identifying the new crop location and the new crop size, and (ii) the numeric representation of the particular image, using a generator neural network to generate a new crop of the particular image at the new crop location and having the new crop size.

16. The method of claim 15, wherein the numeric representation is a collection of numeric values that represents underlying contents of the particular image.

17. The method of claim 15, wherein the numeric representation is a semantic description of the particular image.

18. The method of claim 15, wherein combining the lower-dimension representations of the observations comprises:
summing the lower-dimension representations to generate the numeric representation.

19. The method of claim 15, wherein the generator neural network is configured to:
at each of a plurality of time steps:
sample one or more latent variables for the time step, and
update a hidden state as of the time step by processing the hidden state, the sampled latent variables, the numeric representation, and the data identifying the new crop location and the new crop size using a deep convolutional neural network to generate an updated hidden state; and after a last time step in the plurality of time steps:
generate the new crop of the particular image from the updated hidden state after the last time step.

20. The method of claim 19, wherein generating the new crop of the particular image from the updated hidden state after the last time step comprises:

generating pixel sufficient statistics from the updated hidden state after the last time step; and sampling color values of pixels in the new crop using the pixel sufficient statistics.

21. The method of claim 15, wherein the observation neural network has been trained to generate numeric representations that, in combination with a particular crop location and a particular crop size, is usable by a generator neural network to generate a reconstruction of a particular crop of the particular image at the particular crop location and having the particular crop size.

* * * * *